(12) United States Patent
Nissler et al.

(10) Patent No.: US 9,256,743 B2
(45) Date of Patent: Feb. 9, 2016

(54) REMOTE ENTERPRISE POLICY/CLIENT CONFIGURATION INSTALLATION FOR COMPUTING DEVICES

(75) Inventors: Mattias Stefan Nissler, Munich (DE); William A. Drewry, Nashville, TN (US); Christopher Masone, San Francisco, CA (US); Sumit Gwalani, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 291 days.

(21) Appl. No.: 13/552,563

(22) Filed: Jul. 18, 2012

(65) Prior Publication Data
US 2013/0227090 A1    Aug. 29, 2013

Related U.S. Application Data

(60) Provisional application No. 61/605,141, filed on Feb. 29, 2012.

(51) Int. Cl.
*G06F 21/00* (2013.01)
*G06F 15/177* (2006.01)
*G06F 21/57* (2013.01)

(52) U.S. Cl.
CPC ...................................... *G06F 21/57* (2013.01)

(58) Field of Classification Search
CPC ...... G06F 21/57; H01L 41/0893; H01L 67/22
USPC ......................................................... 709/220
See application file for complete search history.

(56) References Cited

U.S. PATENT DOCUMENTS

| | | | |
|---|---|---|---|
| 5,956,408 A | 9/1999 | Arnold | |
| 6,158,010 A * | 12/2000 | Moriconi et al. | 726/1 |
| 2006/0242685 A1 * | 10/2006 | Heard et al. | |
| 2007/0239861 A1 | 10/2007 | Reeves et al. | |
| 2007/0283346 A1 | 12/2007 | Delgrosso et al. | |
| 2007/0299940 A1 | 12/2007 | Gbadegesin et al. | |
| 2008/0301672 A1 | 12/2008 | Rao et al. | |
| 2009/0106667 A1 | 4/2009 | Lyle et al. | |
| 2010/0037296 A1 * | 2/2010 | Silverstone | |
| 2010/0180221 A1 | 7/2010 | Cloward et al. | |
| 2010/0299719 A1 | 11/2010 | Burks et al. | |
| 2010/0303240 A1 * | 12/2010 | Beachem et al. | |
| 2011/0014866 A1 | 1/2011 | Sultenfuss et al. | |
| 2011/0154028 A1 | 6/2011 | Kirkup et al. | |
| 2011/0307709 A1 | 12/2011 | Cox et al. | |

FOREIGN PATENT DOCUMENTS

EP        1659810 A1    5/2006

* cited by examiner

*Primary Examiner* — Kevin Bates
*Assistant Examiner* — Nazia Naoreen
(74) *Attorney, Agent, or Firm* — McDermott Will & Emery LLP (57) ABSTRACT

Systems and methods for remote an enterprise policy/client configuration installation for client computing devices are provided. In some aspects, a method includes receiving, on a client computing device, via a network, a message including an updated enterprise policy/client configuration associated with an operating system and a signature. The signature identifies a source of the message. The method also includes authenticating the message based on the signature. The method also includes installing the updated an enterprise policy/client configuration. At least a first portion of an enterprise policy/client configuration is configured not to be updatable without receiving the message via the network.

29 Claims, 6 Drawing Sheets

FIG. 6 ured to provide remote enterprise policy/client configuration installation for client computing devices.

REMOTE ENTERPRISE POLICY/CLIENT CONFIGURATION INSTALLATION FOR COMPUTING DEVICES

CROSS-REFERENCE TO RELATED APPLICATION

The present application claims the benefit of priority under 35 U.S.C. §119 from U.S. Provisional Patent Application Ser. No. 61/605,141 entitled "REMOTE ENTERPRISE POLICY/CLIENT CONFIGURATION INSTALLATION FOR COMPUTING DEVICES," filed on Feb. 29, 2012, the disclosure of which is hereby incorporated by reference in its entirety for all purposes.

FIELD

The subject technology generally relates to computer operating systems and, in particular, relates to remote enterprise policy/client configuration installation for computing devices.

BACKGROUND

Oftentimes, enterprise computing device include a local user mode and a local administrator mode. The local user mode allows a user to run software within an operating system of the computing device. The local administrator mode allows an administrator user to adjust operating system settings and configurations on the computing device. In many operating system designs, a local administrator mode may be essential and may not be removable from the computing device. One drawback of this scheme is that a user of the computing device may log in as an administrator and inadvertently or maliciously corrupt the operating system settings or configurations of the computing device. Also, if multiple computing devices, e.g., in an enterprise setting, need to be administered, an administrator may need to memorize or otherwise maintain multiple login identifiers and/or passwords to administer all of the devices. Alternatively, the administrator can maintain a single login identifier and password for all of the devices. However, the latter scheme may cause all of the devices to be compromised if another person learns the administrator's login identifier and password. As the foregoing illustrates, an approach to managing enterprise computing devices that is more secure and requires less memory on the computing device may be desirable.

SUMMARY

The disclosed subject matter relates to a computing device. The computing device includes an operating system enterprise control module. The operating system enterprise control module is configured to receive, via a network, a message including an updated enterprise policy/client configuration associated with an operating system and a signature. The operating system enterprise control module is also configured to authenticate the message based on the signature. The operating system enterprise control module is also configured to install the updated enterprise policy/client configuration. At least a first portion of an enterprise policy/client configuration is configured not to be updatable without receiving the message via the network.

The disclosed subject matter further relates to a computer-implemented method for administration of a client computing device. The method includes receiving, on a server, an updated enterprise policy/client configuration associated with an operating system for a plurality of client computing devices. The operating system for the plurality of client computing devices is configured to forego updating at least a portion of an enterprise policy/client configuration associated with the operating system without accessing a network. The method also includes creating a message including the updated enterprise policy/client configuration and a signature for authenticating the message. The method also includes transmitting, via the network, the message to at least a subset of the plurality of client computing devices. The message is for updating the enterprise policy/client configuration on at least the subset of the plurality of client computing devices.

The disclosed subject matter further relates to a computer-implemented method for administration of a client computing device. The method includes receiving, on the client computing device, via a network, a message including an updated enterprise policy/client configuration associated with an operating system and a signature. The signature identifies a source of the message. The method also includes authenticating the message based on the signature. The method also includes installing the updated enterprise policy/client configuration. At least a portion of an enterprise policy/client configuration is configured not to be updatable without receiving the message via the network.

The disclosed subject matter further relates to a non-transitory computer-readable medium. The computer-readable medium includes instructions that, when executed by a computer, cause the computer to implement a method for administration of the computer. The instructions include code for receiving, via a network, a message including an updated enterprise policy/client configuration associated with an operating system of the computer. The instructions also include code for authenticating the message. The instructions also include code for installing the updated enterprise policy/client configuration. At least a portion of an enterprise policy/client configuration is configured not to be updatable without receiving the message via the network.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology relates to techniques for remote enterprise policy/client configuration installation for client computing devices. In one implementation, a client computing device includes an operating system that is configured to forego updating at least a portion of the enterprise policy/client configuration associated with the operating system without accessing a network. In other words, the portion of the enterprise policy/client configuration may be updated only via a message received via the network, via reinstalling the operating system, or via installing a new operating system to replace the present operating system of the client computing device. The enterprise policy/client configuration may include one or more of operating system software, an enterprise setting for the operating system, a login policy for the operating system, a network setting, a user account setting for the operating system, a browser settings associated with a browser, or an operating system setting. Example operating system settings may include network settings, input device (e.g., trackpad, or keyboard) settings, operating system behavior settings (e.g., operating system behavior on logout, data wiping settings, data logging settings, or data log reporting settings). The operating system behavior settings may be applicable for a machine or for an individual user account on a machine. The data log reporting settings may refer to reporting data logs back to a device external to the client computing device.

The client computing device may also include an operating system enterprise control module running within the operating system. The operating system enterprise control module may be configured to receive, via the network, a message including updated enterprise policy/client configuration associated with the operating system of the client computing device and a signature associated with a trusted service. The operating system enterprise control module may be configured to authenticate the message based on the signature, for example, by verifying that the signature is associated with the trusted service. Based on authenticating the message, the operating system enterprise control module may be configured to install the updated enterprise policy/client configuration on the client computing device. The client computing device may also include a user mode module running within the operating system. The user mode module may be configured to receive a user input and to execute a software program within the operating system in response to the user input.

Advantageously, the client computing device may lack a local administrator mode module configured to update the operating system without accessing the network. As a result, a user of the computing device may not be able to log in as an administrator and inadvertently or maliciously corrupt the enterprise policy/client configuration or configurations of the computing device. Furthermore, an enterprise administrator (e.g., a network or information technology administrator in a corporation or a university) may function as an administrator or owner of multiple remote computing devices simultaneously. The enterprise administrator may manage or control policy settings on the multiple remote client computing devices. The enterprise administrator may not need to have login credentials for each of the multiple remote computing devices and may administer a plurality of the multiple remote computing devices simultaneously from an administrator client machine connected to the network or from an administrator web console. The login credentials may include one or more of a login identifier, a password, a token (e.g., a second factor authentication token), a certificate (e.g., a client certificate), information related to a fingerprint, information related to a smart card, or information associated with an image.

Figure 1:
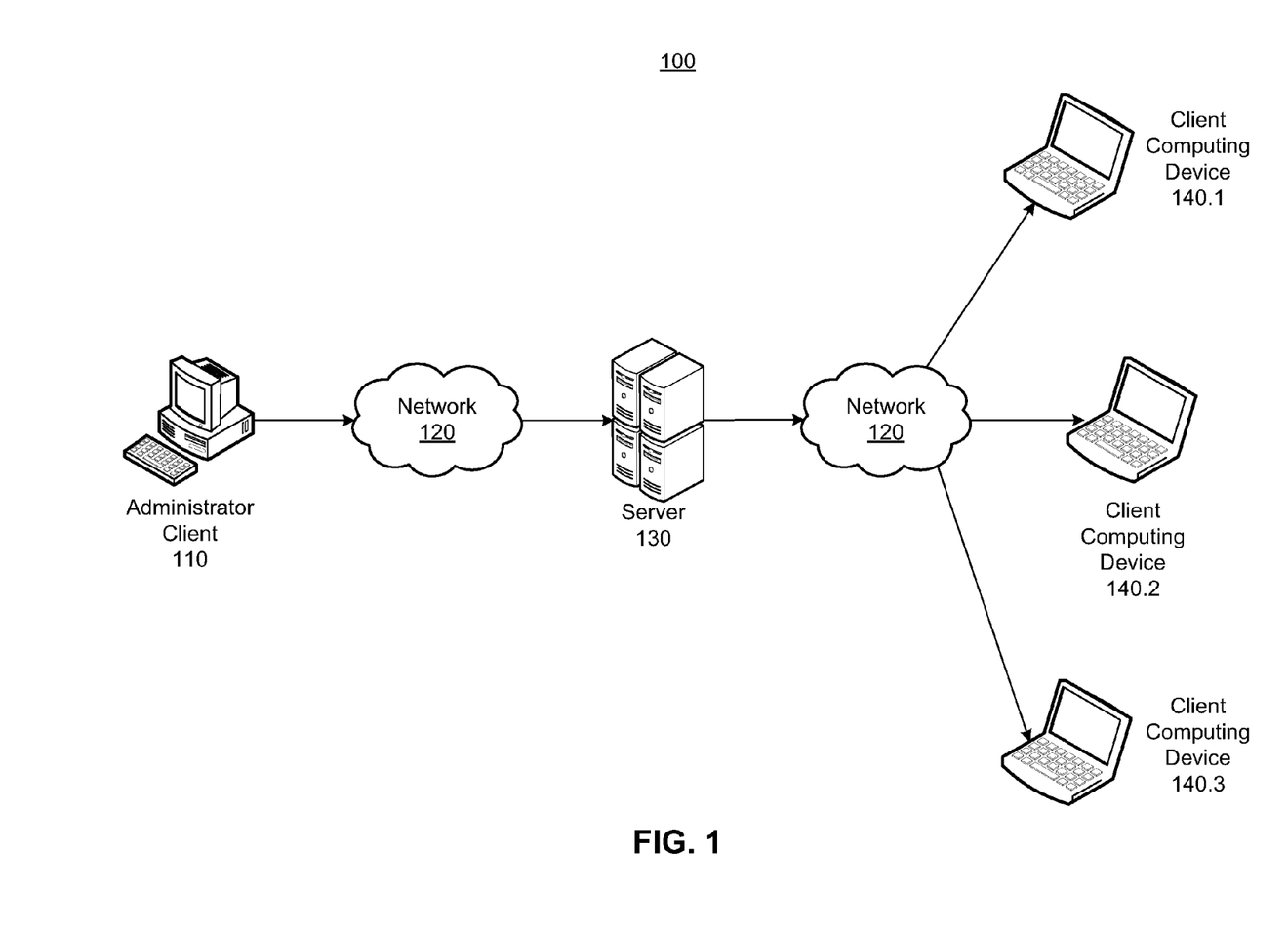
FIG. 1 illustrates an example of a computer system configured to provide remote enterprise policy/client configuration installation for client computing devices.

FIG. 1 illustrates an example of a computer system 100 configured to provide remote enterprise policy/client configuration installation for client computing devices.

As shown, the computer system 100 includes an administrator client 110, a server 120, and client computing devices 140.1, 140.2, and 140.3. While three client computing devices 140 are illustrated, the subject technology may be implemented with any number, e.g., one, two, three, four, five, or more than five, client computing devices 140. The administrator client 110, server 130, and client computing devices 140 may communicate with one another via a network 140, e.g., the Internet or a cellular network. In an alternative implementation, a wired or one-to-one connection, rather than a network connection, may exist between the administrator client 110 and the server 130 or between the server 130 and one or more of the client computing devices 140. In one example, a single machine may implement the functions of both the administrator client 110 and the server 130. The administrator client 110 may be an enterprise administrator client. The server 130 may be an enterprise server. The client computing devices 140 may be enterprise client computing devices, issued to enterprise users, for example, employees of an enterprise.

The administrator client 110 may include a processor and a memory. The processor may be configured to execute computer instructions that are stored in a computer-readable medium, for example, the memory. The processor may be a central processing unit (CPU). The memory may store instructions that, when executed, allow a user, for example, an enterprise administrator or an administrator for one or more client computing devices 140, to enter a new enterprise policy/client configuration for the one or more client computing devices 140. The new enterprise policy/client configuration may be forwarded to the server 130 for further processing. While only a single administrator client 110 is illustrated in FIG. 1, the subject technology may be implemented with one or more administrator clients 110, e.g., in an enterprise setting with multiple network administrators or information technology administrators.

In one example, each of the multiple administrators may have his/her own login credentials to log into the administrator client 110 and to provide a new enterprise policy/client configuration. As a result, multiple administrator accounts (e.g., one for each administrator of the enterprise) may be created on the administrator client(s) 110, and not on the client computing device(s) 140 that are administered by the administrator(s). In another example, the administrator client may be configured to access an administrator web console, and each of the multiple administrators may have his/her own login credentials to log into the administrator web console. As a result, the administrator web console, rather than the administrator client 110 may be used to provide a new enterprise policy/client configuration. Also, an administrator may access the administrator web console from any computing device, not necessarily the administrator client 110. The login credentials may include one or more of a login identifier, a password, a token (e.g., a second factor authentication token), a certificate (e.g., a client certificate), information related to a fingerprint, information related to a smart card, or information associated with an image.

The network 120 may be any network that allows multiple devices to communicate with one another. For example, the network may include the Internet, a cellular network, a WiFi network, a local area network (LAN), a wide area network (WAN), or any other known network. In an alternative implementation, the connection between the administrator client 110 and the server 130 or the connection between the server 130 and one or more client computing devices 140 may be implemented via a direct wired or wireless connection, e.g., a one-to-one or master/slave cable connection or a one-to-one or master/slave Bluetooth® connection.

The server 130 may be an enterprise server that is configured to receive a new enterprise policy/client configuration from the administrator client 110 or from the administrator web console and securely forward the new enterprise policy/client configuration to one or more client computing devices 140. As used herein, the term "enterprise" encompasses its plain and ordinary meaning including, but not limited to, an entity that may exercise control over a plurality of client computing devices. The entity may include one or more of a business, a corporation, a university, a government organization, a research group, a volunteer group, etc. The plurality of computing devices may be associated with one or more of employees of the entity, students of the entity, faculty of the entity, or volunteers of the entity. The server 140 is described in more detail in conjunction with FIG. 2 below. An entity may have a single site or multiple sites where policies may be pushed. If there are multiple sites, each of the multiple sites may include the same enterprise policy/client configuration or different enterprise policy/client configurations. Also, an entity may include sub-entities (e.g., units within an organization) with some enterprise policy/client configurations unique to each sub-entity, and some enterprise policy/client configurations common to all sub-entities.

Each of the client computing devices 140 may be an enterprise client computing device and may be running either a standard version of an operating system or an enterprise version of an operating system. The client computing device 140 may be configured to receive a new enterprise policy/client configuration from a server (e.g., server 130), authenticate the enterprise policy/client configuration, and install the new enterprise policy/client configuration. The client computing device 140 is described in more detail in conjunction with FIG. 3 below.

Figure 2:
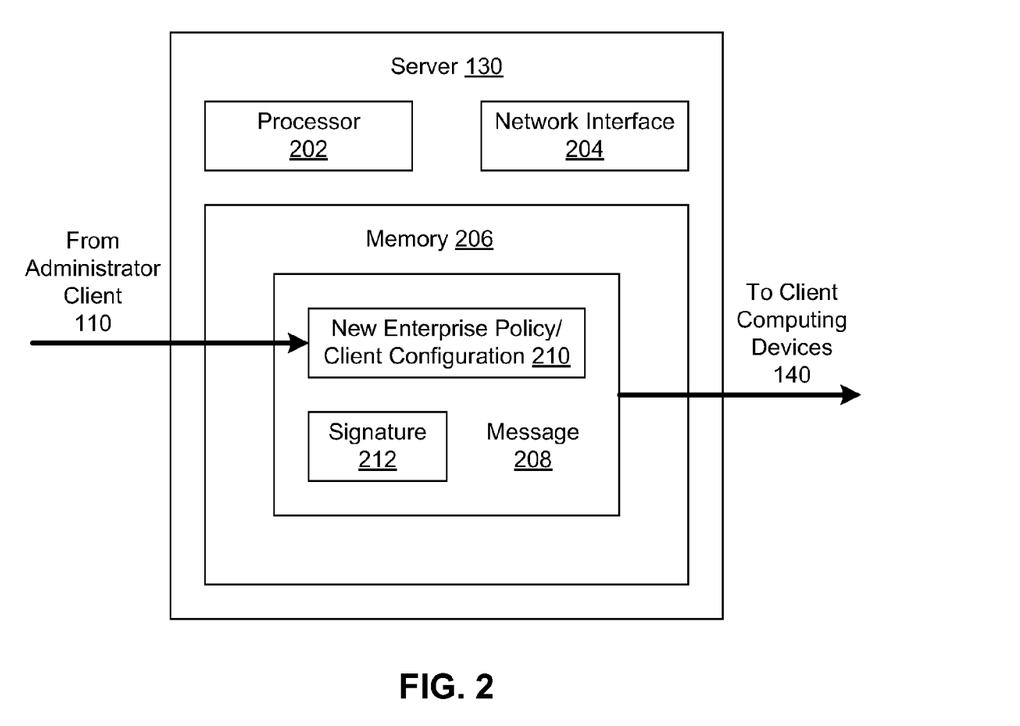
FIG. 2 illustrates an example of the server of FIG. 1 in more detail.

FIG. 2 illustrates an example of the server 130 in more detail.

As shown, the server 130 includes a processor 202, a network interface 204, and a memory 206. The processor 202 is configured to execute computer instructions that are stored in a computer-readable medium, for example, the memory 206. The processor 202 may be a central processing unit (CPU). The network interface 204 is configured to allow the server 130 to transmit and receive data in a network, e.g., network 120. The network interface 204 may include one or more network interface cards (NICs). The memory 206 is configured to store data or instructions. As illustrated, the memory 206 includes a message 208.

The message 208 may be generated on the server 130 and may be transmitted by the server 130 to the one or more client computing devices 140. In one implementation, the message 208 may be transmitted to a plurality of client computing devices. As shown, the message includes a new enterprise policy/client configuration 210 and a signature 212. As used herein, the term "software" encompasses its plain and ordinary meaning including, but not limited to instructions or data that are stored electronically or are configured to be stored electronically.

The new enterprise policy/client configuration 210 may be received by the server 130 from the administrator client 110 or the administrator web console. The new enterprise policy/client configuration 210 may be associated with an operating system of the one or more client computing devices 140. The new enterprise policy/client configuration 210 may include one or more of operating system software for the operating system of the client computing devices, an update for the operating system, an updated enterprise setting for the operating system, an updated login policy for the operating system, an updated user account setting for the operating system, or applications configured to execute within the operating system. The new enterprise policy/client configuration 210 may include only a new enterprise policy or only a new client configuration. The new enterprise policy/client configuration may include a single data item or multiple data items. The new enterprise policy/client configuration 210 may include browser settings associated with a browser. The new enterprise policy/client configuration 210 may be transmitted from the server 130 to the client computing device 140 for installation on the client computing device 140.

The signature 212 may identify the server 130 or another trusted machine as the source of the message 208 and the new enterprise policy/client configuration 210. The signature 212 may be configured or stored in a manner to ensure that only the server 130 or another trusted machine may sign a message (e.g., message 208) with the signature 212.

In one implementation, the server 130 may be implemented as two servers, an update server and an enterprise server. Each of the update server and the enterprise server may be implemented as a single machine with a single processor, a single machine with multiple processors, or as a server farm including multiple machines with multiple processors. The update server may provide the message 208 including the new enterprise policy/client configuration 210 to the client computing device 140. The enterprise server may include logic that selects a version of the new enterprise policy/client configuration 210 (out of one or more available new enterprise policy/client configurations) may be sent to the client computing device 140. In one example, the message 208 including the new enterprise policy/client configuration 210 may be transmitted from the update server to the client computing device 130 via the enterprise server. The enterprise server may point the client computing device 130 to an update payload (in addition to the data from the update server) for updating the client computing device 130 and other machines that have enrolled into the enterprise policy/client configuration update service of the enterprise server.

Figure 3:
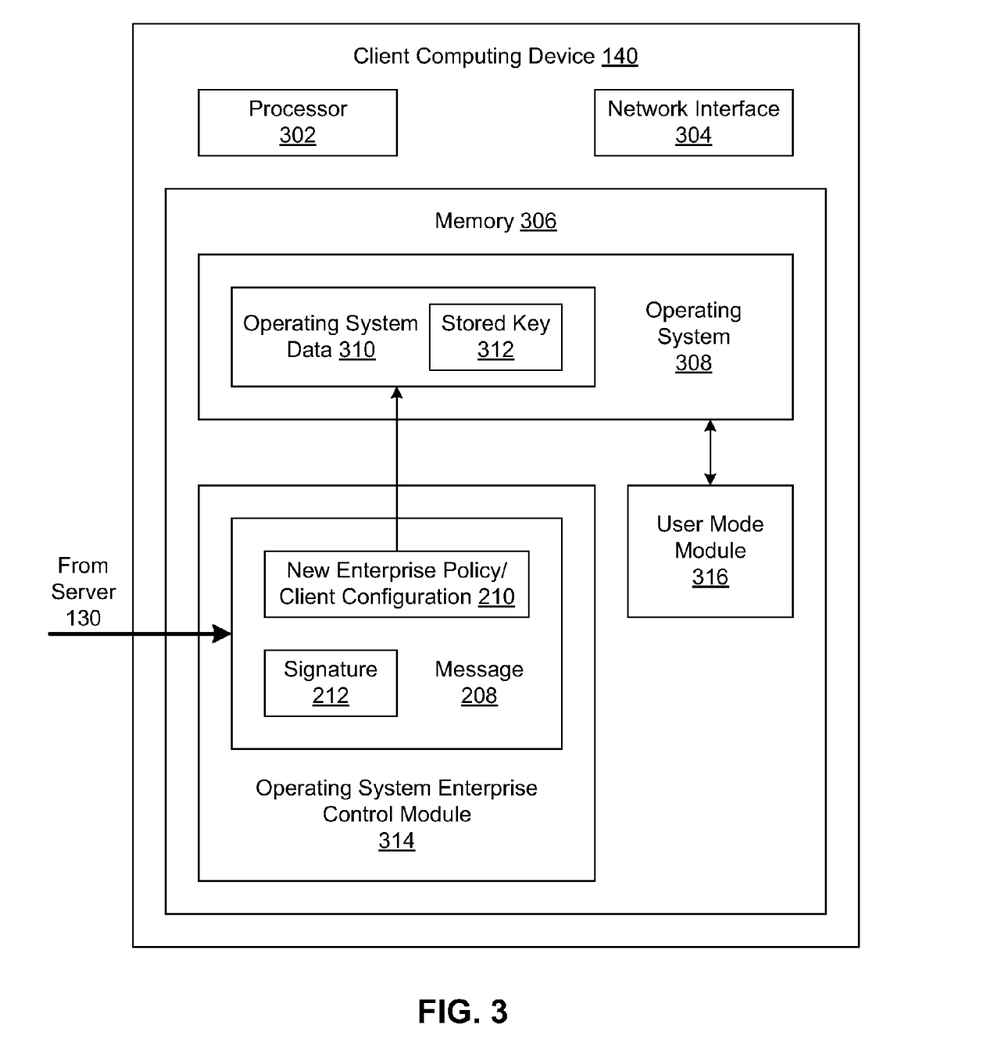
FIG. 3 illustrates an example of the client computing device of FIG. 1 in more detail.

FIG. 3 illustrates an example of the client computing device 140 in more detail.

As shown, the client computing device 140 includes a processor 302, a network interface 304, and a memory 306.

The processor 302 is configured to execute computer instructions that are stored in a computer-readable medium, for example, the memory 306. The processor 302 may be a central processing unit (CPU). The network interface 304 is configured to allow the client computing device 140 to transmit and receive data in a network, e.g., network 120. The network interface 304 may include one or more network interface cards (NICs). The memory 206 is configured to store data or instructions. As illustrated, the memory 306 includes an operating system 308, an operating system setting update module 314, and a user mode module 316.

The operating system 308 may include a set of programs that manage the hardware, e.g., the processor 302, of the client computing device 140 and allow applications to execute within the operating system 308. As shown, the operating system 308 includes an enterprise policy/client configuration 310. The operating system 308 may be configured to forego updating at least a portion of the enterprise policy/client configuration 310 associated with the operating system 308 without accessing a network, e.g., network 120. In one implementation, the operating system 308 may be configured to update at least the portion of the enterprise policy/client configuration 310 only via a message (e.g., message 208) received via a network (e.g., network 120), via reinstalling the operating system 308, or via installing a new operating system in place of operating system 308.

The enterprise policy/client configuration 310 may include one or more of an operating system setting, an enterprise setting for the operating system, a login policy for the operating system, a user account setting for the operating system, or an application. The enterprise policy/client configuration 310 may include browser settings associated with a browser. The enterprise policy/client configuration 310 may include a stored key 312, e.g., a public key for the client computing device 140. In one implementation, the stored key 312 may be used to verify the signature 212 of the message 208 as being from the server 130 or another trusted machine.

As shown, the memory 306 of the client computing device 140 also includes an operating system enterprise control module 314. The operating system enterprise control module 314 may receive, e.g., via the network 120 from the server 130, the message 208 including the new enterprise policy/client configuration 210 and the signature 212 of the server 130. The operating system enterprise control module 314 may authenticate the message 208 as being from the server 130 or another trusted machine based on the signature 212 in the message 208. In one example, the stored key 312 may be used to verify the signature 212 of the message 208 as being from the server 130 or another trusted machine. Based on successfully authenticating the message 208, the operating system enterprise control module 314 may be configured to install the new enterprise policy/client configuration 210 into the enterprise policy/client configuration 310 of the client computing device 140. For example, the operating system enterprise control module 314 may update the enterprise policy/client configuration 310 based on the new enterprise policy/client configuration 210.

The memory 306 of the client computing device 140 may also include a user mode module 316. The user mode module 316 may be configured to receive a user input, e.g., from an end-user of the client computing device 140, requesting to execute a software program or an application within the operating system. The user mode module 316 may also be configured to execute the software program or application within the operating system. The operating system enterprise control module 314 may be separate and distinct from the user mode module 316. In one example, the user mode module 316 is configured to update at least a portion the enterprise policy/client configuration, different from the portion of the enterprise policy/client configuration updated by the operating system enterprise control module 314. In another example, the user mode module 316 is not configured to update a portion the enterprise policy/client configuration.

Advantageously, the client computing device 140 may lack an administrator mode module configured to update the enterprise policy/client configuration 310 without accessing a network (e.g., network 120). As a result, memory space may be saved on the client computing device 140 and a user of the computing device may not be able to log in as an administrator and inadvertently or maliciously corrupt the enterprise policy/client configuration 310 or configurations of the client computing device 140.

In an alternative example, the client computing device 140 may include an administrator mode module. The administrator mode module may be stored on the client computing device 140 and coupled with the operating system 308 of the client computing device 140. A portion of the enterprise policy/client configuration 310 may be updated by a local user of the client computing device 140 via the administrator mode module, while another portion of the enterprise policy/client configuration 310 of the client computing device 140 may be updated via the operation of the operating system enterprise control module 314. The administrator mode module may update the enterprise policy/client configuration 310 with or without accessing the network (e.g., network 120). The portion of the enterprise policy/client configuration 310 updated by the administrator mode may be separate and distinct from the portion of the enterprise policy/client configuration 310 updated by the operating system enterprise control module 314. Specifically, the portion of the enterprise policy/client configuration 310 updated by the operating system enterprise control module 314 may include system logging settings and security settings, while the portion of the enterprise policy/client configuration 310 updated by the administrator mode may not include system logging settings and security settings. In one example, the enterprise administrator (e.g., via the administrator client 110 or via the administrator web console) may select the portion of the enterprise policy/client configuration 310 that may be updated by the local user and the portion of the enterprise policy/client configuration 310 that may be updated via the operation of the operating system enterprise control module.

In an enterprise implementation, in creating the operating system enterprise control module 314 for an enterprise client computing device 140, the enterprise may not need to explicitly control which enterprise policy/client configurations 310 can be managed by the administrator mode and the enterprise may not need to disable the administrator mode. Instead, the enterprise policy/client configuration 310 associated with the enterprise or of interest to the enterprise (e.g., anti-virus settings, network settings, operating system version information, etc.) may be updated via the operating system enterprise control module 314. Alternatively, all of the enterprise policy/client configurations 310 may be updated via the operating system enterprise control module 314.

In one implementation, the client computing device 140 may include a secure lockable storage module. The secure lockable storage module may indicate an enterprise configuration for updating the enterprise policy/client configuration 310 of the client computing device 140. The secure lockable storage module may not be configured to be reset unless the operating system 308 of the client computing device 140 is reset or replaced. The enterprise configuration may be associated with one or more of a business, a corporation, an employer, a university, etc. The secure lockable storage module may include the enterprise configuration information and may ensure that the enterprise is considered the owner or administrator of the device. As used herein, the terms "owner" and "administrator" encompass their plain and ordinary meanings, including but no limited an entity authorized to update or modify the enterprise policy/client configuration on a device. In one implementation, the secure lockable storage module is configured in a manner such that the secure lockable storage module cannot be reset or modified if the operating system 308 on the client computing device 130 is reset or modified (e.g., if the user installs a new operating system, different from the operating system 308, on the client computing device 130).

Figure 4:
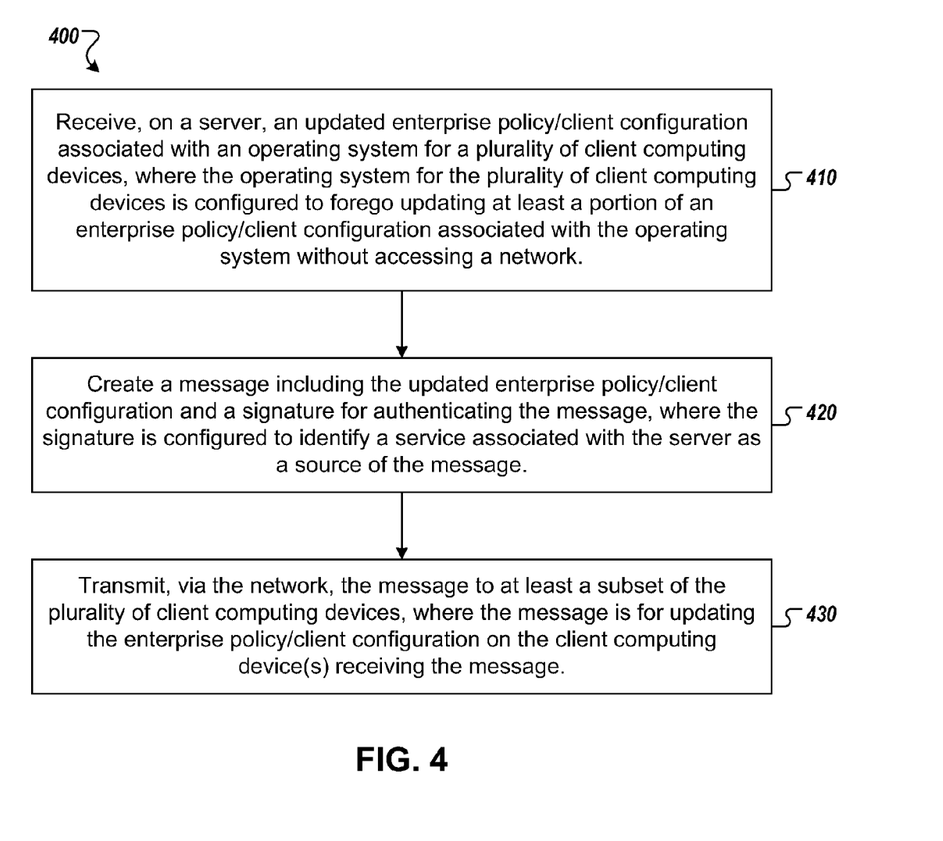
FIG. 4 illustrates an example process by which a server may provide remote enterprise policy/client configuration installation for client computing devices.

FIG. 4 illustrates an example process 400 by which a server may provide remote enterprise policy/client configuration installation for client computing devices.

The process 400 begins at step 410, where the server (e.g., server 130) receives (e.g., from administrator client 110 or from the administrator web console) an updated enterprise policy/client configuration associated with an operating system for a plurality of client computing devices (e.g., client computing devices 140). The operating system for the plurality of client computing devices may be configured to forego updating at least a portion of the enterprise policy/client configuration associated with the operating system without accessing a network (e.g., network 120). The updated enterprise policy/client configuration may include one or more of an updated operating system setting, a new operating system setting an update for the operating system, an updated enterprise setting for the operating system, an updated login policy for the operating system, an updated user account setting for the operating system, or an updated browser setting associated with a browser, an updated application, or a new application. The enterprise policy/client configuration associated with the operating system for the plurality of client computing devices may include one or more of an enterprise setting for the operating system, a login policy for the operating system, a user account setting for the operating system, or browser settings associated with a browser.

In one example, in order to connect to the server, a user of an administrator client or an administrator web console may need to provide login credentials. The login credentials may include one or more of a login identifier, a password, a token (e.g., a second factor authentication token), a certificate (e.g., a client certificate), information related to a fingerprint, information related to a smart card, or information associated with an image. In response to receiving the login credentials provided from the administrator client or the administrator web console, the server may verify the login credentials. Verifying the login credentials may include verifying that a login identifier within the login credentials is a member of a stored set of login identifiers. The stored set of login identifiers may include multiple login identifiers. The login credentials may be associated with the user of the administrator client or the administrator web console and the login credentials may not be associated with any of the computing devices to be administered (e.g., client computing devices 140). If the login credentials are not verified, the process 400 may end. However, if the login credentials are verified, the process 400 may continue to step 420.

In step 420, the server may create a message including the updated enterprise policy/client configuration and a signature for authenticating the message. The signature may be configured to identify a service associated with the server as a source of the message. The service may include the server and other trusted machines. The service may be identified by a uniform resource indicator (URI), for example, a uniform resource locator (URL).

In step 430, the server transmits, via the network, the message to at least a subset of the plurality of client computing devices. In one example, the server may transmit the message responsive to verifying the login credentials of the user of the administrator client or the administrator web console. The message may be for updating the enterprise policy/client configuration on at least the subset of the plurality of client computing devices (e.g., for updating the enterprise policy/client configuration on the client computing devices receiving the message). The subset of the plurality of client computing devices may include all or a portion of the client computing devices in the plurality. The subset may include one, two, three, four, five, or more than five client computing devices. After step 430, the process 400 ends.

Figure 5:
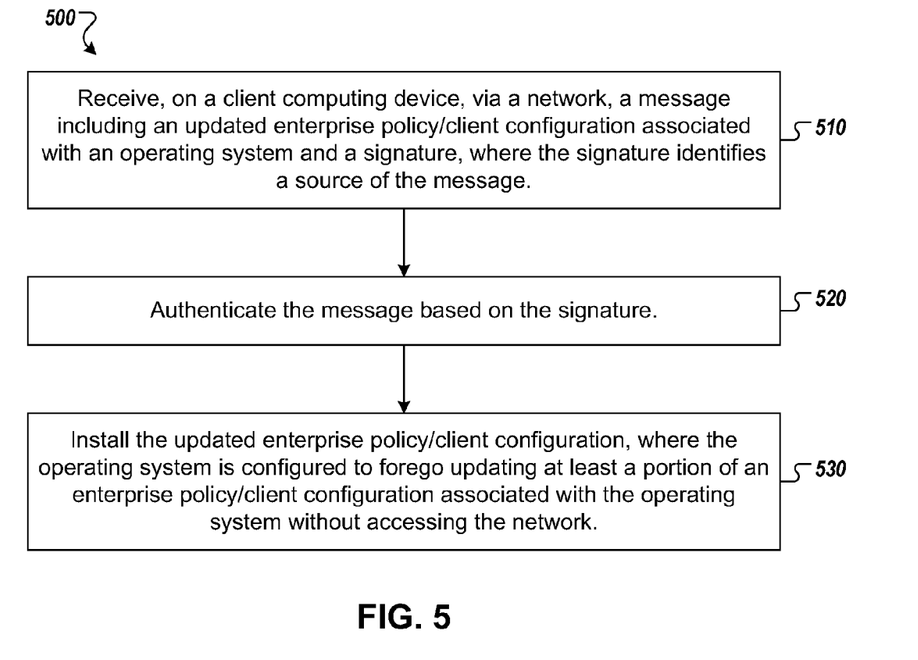
FIG. 5 illustrates an example process by which a client computing device may install an enterprise policy/client configuration.

FIG. 5 illustrates an example process 500 by which a client computing device may install an enterprise policy/client configuration.

In step 510, the client computing device (e.g., client computing device 140) receives, via a network (e.g., network 120) a message including an updated enterprise policy/client configuration associated with an operating system (e.g., the operating system of the client computing device) and a signature. The signature may identify the source of the message. The updated enterprise policy/client configuration may include one or more of an updated operating system setting or an updated application executing within the operating system. The updated operating system setting may include an update for the operating system, an updated enterprise setting for the operating system, an updated login policy for the operating system, an updated user account setting for the operating system, or an updated browser setting associated with a browser.

In step 520, the client computing device authenticates the message based on the signature. If the client computing device successfully authenticates the message, the process 500 may continue to step 530. However, if the client computing device fails to authenticate the message, the process 500 may end and forego continuing to step 530. The client computing device may authenticate the message by verifying the signature based on a stored key. The stored key may be stored in the memory of the client computing device. The updated enterprise policy/client configuration may include an update to the stored key.

The client computing device may authenticate the message by verifying that the source of the message is a member of a set of trusted sources. The source of the message may be identified by a uniform resource indicator (URI), for example, a uniform resource locator (URL). If the source of the message is a member of the set of trusted sources, the client computing device may install the updated enterprise policy/client configuration in the message according to step 530. However, if the source of the message is not a member of the set of trusted sources, the client computing device may forego installing the updated enterprise policy/client configuration according to step 530.

In step 530, the client computing device installs the updated enterprise policy/client configuration. The operating system may be configured to forego updating at least a portion of the enterprise policy/client configuration associated with the operating system without accessing the network. The portion of the enterprise policy/client configuration or, in one implementation, all of the enterprise policy/client configuration, may be configured to be updated only via the message received via the network, via reinstalling the operating system, or via installing a new operating system. The enterprise policy/client configuration associated with the operating system may include one or more of an enterprise setting for the operating system, a login policy for the operating system, a user account setting for the operating system, or browser settings associated with a browser. After step 530, the process 500 ends.

Figure 6:
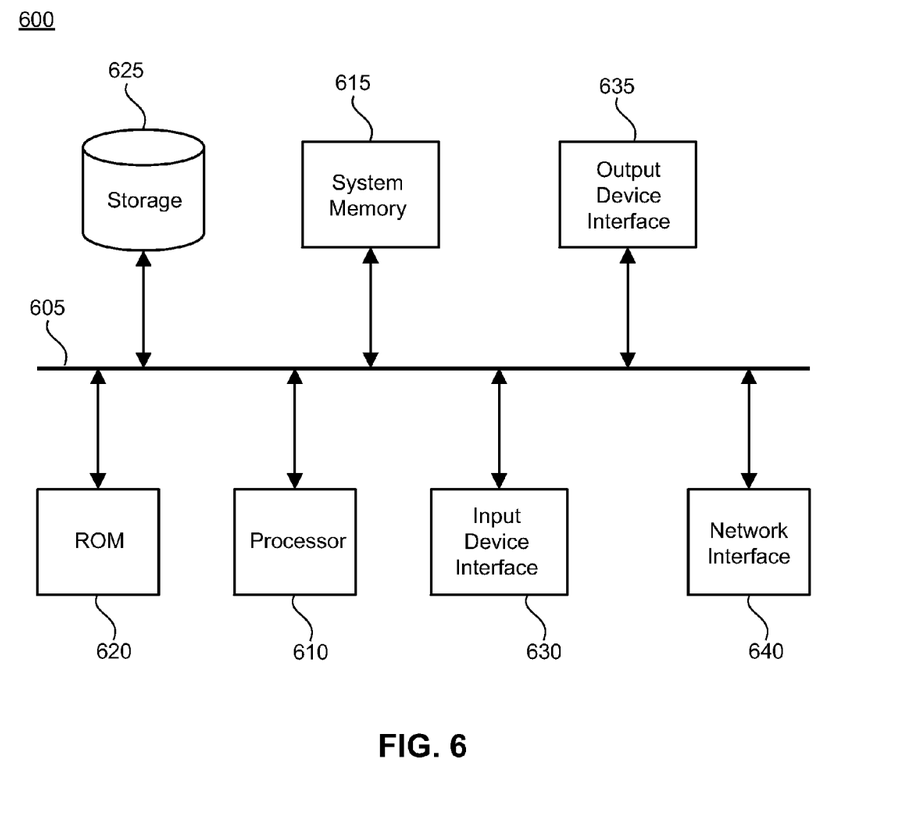
FIG. 6 conceptually illustrates an example electronic system with which some implementations of the subject technology are implemented.

FIG. 6 conceptually illustrates an electronic system 600 with which some implementations of the subject technology are implemented. For example, one or more of the administrator client 110, the server 130, or the client computing devices 140 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for remote enterprise policy/client configuration installation for client computing devices in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touchscreen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:
1. A computing device comprising:
one or more processors; and
a memory comprising instructions which, when executed by the one or more processors, cause the one or more processors to:

receive, via a network, a message comprising an updated enterprise policy/client configuration associated with an operating system and a signature;

authenticate the message based on the signature; and install the updated enterprise policy/client configuration in an enterprise policy/client configuration storage region of the memory, wherein a first portion of the enterprise policy/client configuration storage region of the memory is not updatable without receiving the message via the network, and wherein a second portion of the enterprise policy/client configuration storage region of the memory cannot be reset unless the operating system is replaced.

2. The computing device of claim 1, wherein the at least a third portion of the enterprise policy/client configuration is configured to be updated only via the message received via the network, via reinstalling the operating system, or via installing a new operating system.

3. The computing device of claim 1, wherein the operating system is configured to forego updating the at least the first portion of the enterprise policy/client configuration associated with the operating system without receiving the message via the network.

4. The computing device of claim 1, wherein the memory further comprises instructions which, when executed by the one or more processors, cause the one or more processors to forego updating the at least the first portion of the enterprise policy/client configuration associated with the operating system without receiving the message via the network.

5. The computing device of claim 1, the memory further comprising instructions which, when executed by the one or more processors, cause the one or more processors to:

receive a user input requesting to execute a software program within the operating system, and execute the software program within the operating system.

6. The computing device of claim 5, the memory further comprising instructions which, when executed by the one or more processors, cause the one or more processors to update at least a fourth portion of the enterprise policy/client configuration while the computing device is in a user mode.

7. The computing device of claim 1, the memory further comprising instructions which, when executed by the one or more processors, cause the one or more processors to update at least a fourth portion of the enterprise policy/client configuration while the computing device is in an administrator mode.

8. The computing device of claim 7, wherein the fourth portion of the enterprise policy/client configuration is separate and distinct from the first portion of the enterprise policy/client configuration.

9. The computing device of claim 7, wherein the first portion of the enterprise policy/client configuration comprises system logging settings and security settings, wherein the fourth portion of the enterprise policy/client configuration does not comprise system logging settings and security settings, and wherein the logging settings comprise settings for reporting or logging one or more of operating system behavior, user behavior, operating system configuration, or network configuration.

10. The computing device of claim 1, wherein the enterprise policy/client configuration associated with the operating system comprises one or more operating system settings associated with the operating system, and wherein the updated enterprise policy/client configuration associated with an operating system comprises one or more updated operating system settings associated with the operating system.

11. The computing device of claim 10, wherein the one or more operating system settings associated with the operating system comprise one or more of: an enterprise setting for the operating system, a login policy for the operating system, a user account setting for the operating system, or browser settings associated with a browser.

12. The computing device of claim 1, wherein the enterprise policy/client configuration associated with the operating system comprises one or more software applications configured to execute within the operating system, and wherein the updated enterprise policy/client configuration associated with an operating system comprises one or more updated software applications configured to execute within the operating system.

13. The computing device of claim 1, wherein the updated enterprise policy/client configuration comprise one or more of: an update for the operating system, an updated enterprise setting for the operating system, an updated login policy for the operating system, an updated user account setting for the operating system, or an updated browser setting associated with a browser.

14. A computer-implemented method for administration of a client computing device, the method comprising:

receiving, on a server, an updated enterprise policy/client configuration associated with an operating system for a plurality of client computing devices for modifying an enterprise policy/client configuration storage region of the client computing devices, wherein the operating system for the plurality of client computing devices is configured to forego modifying a first portion of the enterprise policy/client configuration storage region without accessing a network, and wherein a second portion of the enterprise policy/client configuration storage region cannot be reset unless the operating system is replaced;

creating a message comprising the updated enterprise policy/client configuration and a signature for authenticating the message; and transmitting, via the network, the message to at least a subset of the plurality of client computing devices.

15. The method of claim 14, wherein the enterprise policy/client configuration associated with the operating system comprises one or more operating system settings for the operating system.

16. The method of claim 14, wherein the updated enterprise policy/client configuration comprises an update to one or more operating system settings for the operating system.

17. The method of claim 14, wherein the signature is configured to identify a service associated with the server as a source of the message.

18. The method of claim 14, further comprising:

receiving, on the server, login credentials of an administrator; and verifying the login credentials of the administrator;

wherein transmitting the message to at least a subset of the plurality of client computing devices comprises transmitting the message to at least a subset of the plurality of client computing devices responsive to verifying the login credentials of the administrator.

19. The method of claim 18, wherein the login credentials are not associated with a client computing device within the plurality of client computing devices.

20. The method of claim 18, wherein verifying the login credentials of the administrator comprises verifying that a login identifier within the login credentials is a member of a stored set of login identifiers.

21. A computer-implemented method for administration of a client computing device, the method comprising:

receiving, on the client computing device, via a network, a message comprising an updated enterprise policy/client configuration associated with an operating system and a signature, wherein the signature identifies a source of the message;

authenticating the message based on the signature; and installing the updated enterprise policy/client configuration in an enterprise policy/client configuration storage region of a memory of the client computing device, wherein a first portion the enterprise policy/client configuration storage region of the memory is not updatable without receiving the message via the network, and wherein a second portion of the enterprise policy/client configuration storage region of the memory cannot be reset unless the operating system is replaced.

22. The method of claim 21, wherein the at least a third portion of the enterprise policy/client configuration are configured to be updated only via the message received via the network, via reinstalling the operating system, or via installing a new operating system.

23. The method of claim 21, wherein the updated enterprise policy/client configuration comprise one or more of: an update for the operating system, an updated enterprise setting for the operating system, an updated login policy for the operating system, an updated user account setting for the operating system, or an updated browser setting associated with a browser.

24. The method of claim 21, wherein authenticating the message based on the signature comprises verifying the signature based on a stored key, further wherein the stored key is stored on the client computing device.

25. The method of claim 24, wherein the updated enterprise policy/client configuration comprise an update to the stored key.

26. The method of claim 21, further comprising:

verifying that the source of the message is a member of a set of trusted sources; and if the source of the message is the member of the set of trusted sources, installing the updated enterprise policy/client configuration.

27. The method of claim 26, further comprising: if the source of the message is not the member of the set of trusted sources, foregoing installing the updated enterprise policy/client configuration.

28. A computer-readable medium for administration of a computer, the computer-readable medium comprising instructions that, when executed by the computer, cause the computer to:

receive, via a network, a message comprising an updated enterprise policy/client configuration associated with an operating system of the computer;

authenticate the message; and install the updated enterprise policy/client configuration in an enterprise policy/client configuration storage region of a memory of the computer, wherein a first portion of the enterprise policy/client configuration storage region of the memory is not updatable without receiving the message via the network, and wherein a second portion of the enterprise policy/client configuration storage region of the memory cannot be reset unless the operating system is replaced.

29. The computer-readable medium of claim 28, wherein the message further comprises a signature, further wherein the instructions to authenticate the message comprise instructions that, when executed by the computer, cause the computer to authenticate the message based on the signature.

* * * * *